(12) United States Patent
Grisby

(10) Patent No.: US 9,116,968 B2
(45) Date of Patent: Aug. 25, 2015

(54) METHODS AND APPARATUS RELATED TO GRAPH TRANSFORMATION AND SYNCHRONIZATION

(75) Inventor: Duncan P. Grisby, Cambridge (GB)

(73) Assignee: BMC SOFTWARE, INC., Houston, TX (US)

( * ) Notice: Subject to any disclaimer, the term of this patent is extended or adjusted under 35 U.S.C. 154(b) by 457 days.

(21) Appl. No.: 13/174,308

(22) Filed: Jun. 30, 2011

(65) Prior Publication Data

US 2013/0006935 A1    Jan. 3, 2013

(51) Int. Cl.
G06F 17/30    (2006.01)
(52) U.S. Cl.
CPC ............................... G06F 17/30563 (2013.01)
(58) Field of Classification Search
CPC ...................... G06F 17/30563; G06F 17/30958
USPC ......................................................... 707/635
See application file for complete search history.

(56) References Cited

U.S. PATENT DOCUMENTS

| | | | |
|---|---|---|---|
| 7,176,921 B2 * | 2/2007 | Rising et al. .................. | 345/440 |
| 7,930,432 B2 * | 4/2011 | Blaszczak ..................... | 709/246 |
| 8,903,762 B2 * | 12/2014 | Jin et al. ........................ | 707/602 |
| 2005/0262470 A1 | 11/2005 | Gavrilov | |
| 2007/0050318 A1 | 3/2007 | Tirri et al. | |
| 2007/0239694 A1 * | 10/2007 | Singh et al. ................... | 707/707 |
| 2009/0171876 A1 | 7/2009 | Tirri | |
| 2012/0030245 A1 * | 2/2012 | Herrnstadt .................... | 707/798 |
| 2012/0072391 A1 * | 3/2012 | Simitsis et al. ............... | 707/602 |
| 2014/0067750 A1 * | 3/2014 | Ranganathan et al. ....... | 707/602 |

* cited by examiner

*Primary Examiner* — Robert Beausoliel, Jr.
*Assistant Examiner* — Alexandria Bromell
(74) *Attorney, Agent, or Firm* — Brake Hughes Bellermann LLP

(57) ABSTRACT

In one general aspect, a computer system can include instructions configured to store on a non-transitory computer-readable storage medium. The computer system can include a subgraph transformer configured to transform a plurality of subgraphs of a source graph into a plurality of transformed subgraphs, and configured to define a target graph that is a transformed version of the source graph based on the plurality of transformed subgraphs. The computer system can include a change detector configured to receive an indicator that a portion of the source graph has been changed, and a synchronization module configured to synchronize a portion of the target graph with the changed portion of the source graph.

25 Claims, 14 Drawing Sheets

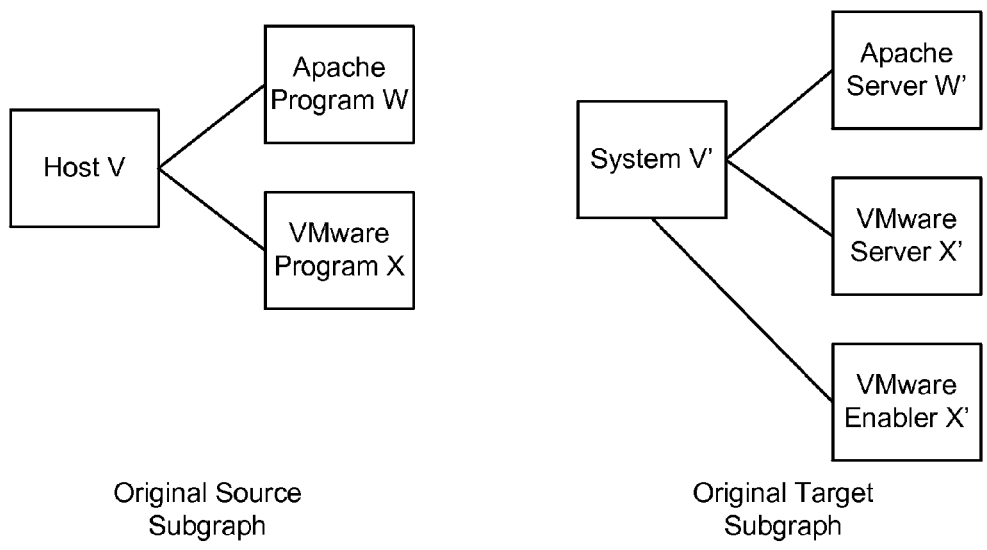
FIG. 8A
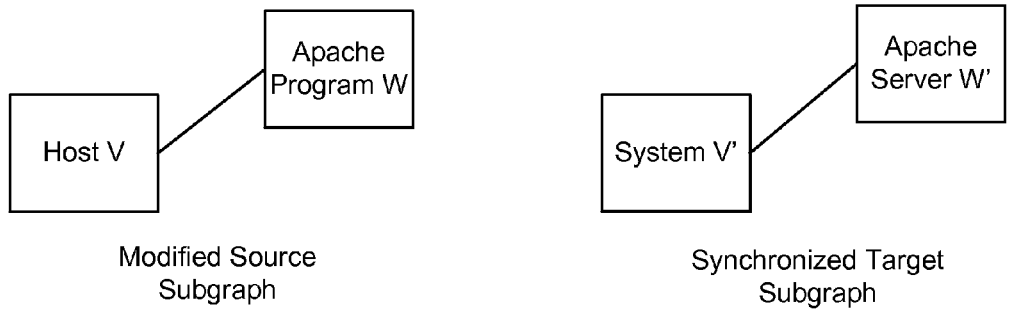
FIG. 8B
FIG. 8C

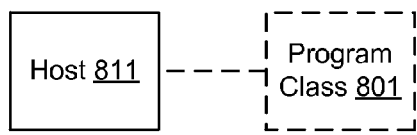
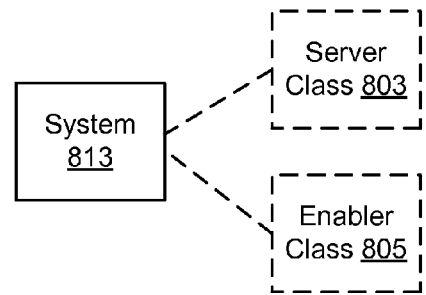
Source Class Graph
Target Class Graph
FIG. 8D
FIG. 8E

```
host = starting node kind "Host"

system = construct "System" : name = host.name, type := host.type for program in host traverse "Running" to "Program"

server = construct "Server" : name = program.name link server to system with "RunningOn"

if program.type == "VMware" then
        enabler = construct "Enabler" : name = program.name
        link enabler to system with "RunningOn"
        link enabler to server with "EnablerServer"

for contained_host in program traverse "Contained" to "Host"

contained_system = find "System" : name = contained_host.name link enabler to contained_system with "VirtualMachine"
        end for end if end for for interface in host traverse "Interface" to "NetworkInterface"

if interface.v6 then
        address = construct "IPv6Address" : name = interface.ip_address
    else
        address = construct "IPv4Address" : name = interface.ip_address
    end if link address to system with "Address"

end for
```

FIG. 11

Source Subgraph

Target Subgraph

METHODS AND APPARATUS RELATED TO GRAPH TRANSFORMATION AND SYNCHRONIZATION

TECHNICAL FIELD

This description relates to graph transformation and synchronization.

BACKGROUND

Known Extract, Transform, and Load (ETL) programs can be configured to operate on various types of tabular data, extensible mark-up language (XML) data, and so forth. These known ETL programs can be configured to, for example, transform data from one format compatible with a system into another format compatible with another system. These known ETL programs, however, may not be capable of processing graph data for graph-to-graph transformations in an efficient fashion. Graph data can be used to represent social networking relationships, document management systems, and so forth. Many graph-to-graph transformations can be difficult, or even impossible, to implement using known ETL programs. Thus, a need exists for systems, methods, and apparatus to address the shortfalls of present technology and to provide other new and innovative features.

SUMMARY

In one general aspect, a computer system can include instructions configured to store on a non-transitory computer-readable storage medium. The computer system can include a subgraph transformer configured to transform a plurality of subgraphs of a source graph into a plurality of transformed subgraphs, and configured to define a target graph that is a transformed version of the source graph based on the plurality of transformed subgraphs. The computer system can include a change detector configured to receive an indicator that a portion of the source graph has been changed, and a synchronization module configured to synchronize a portion of the target graph with the changed portion of the source graph.

In another general aspect, a computer-readable storage medium can store instructions that when executed cause a processor to perform a process. The instructions can include instructions to access at least a portion of a source graph including a plurality of nodes and relationships between the plurality of nodes, and access at least a portion of a target graph including a plurality of nodes and relationships between the plurality of nodes. The instructions can include instructions to identify, based on a subgraph collection rule, a subgraph of the source graph starting at a node from the plurality of nodes identified as a source root node, and define, based on a transformation rule, a transformed subgraph based on the subgraph of the source graph. The instructions can also include instructions to modify a subgraph from the target graph based on the transformed subgraph.

In yet another general aspect, a computer-readable storage medium can store instructions that when executed cause a processor to perform a process. The instructions can include instructions to receive an indicator of a changed portion of a source graph including a plurality of nodes and relationships between at least a portion of the plurality of nodes, and identify, in response to the indicator, a subgraph of the source graph that includes the changed portion. The instructions can include instructions to identify a subgraph of a target graph corresponding with the subgraph of the source graph, and identify, based on a class graph, a node to be modified within the subgraph of the target graph where the node is an instance of a node included in a class of nodes from the class graph.

The details of one or more implementations are set forth in the accompanying drawings and the description below. Other features will be apparent from the description and drawings, and from the claims.

BRIEF DESCRIPTION OF THE DRAWINGS

FIGS. 8A through 8E are diagrams that illustrate various aspects of transformation and synchronization of source graphs and target graphs.

FIG. 11 is an example of a transformation script, according to an embodiment.

DETAILED DESCRIPTION

Figure 1:
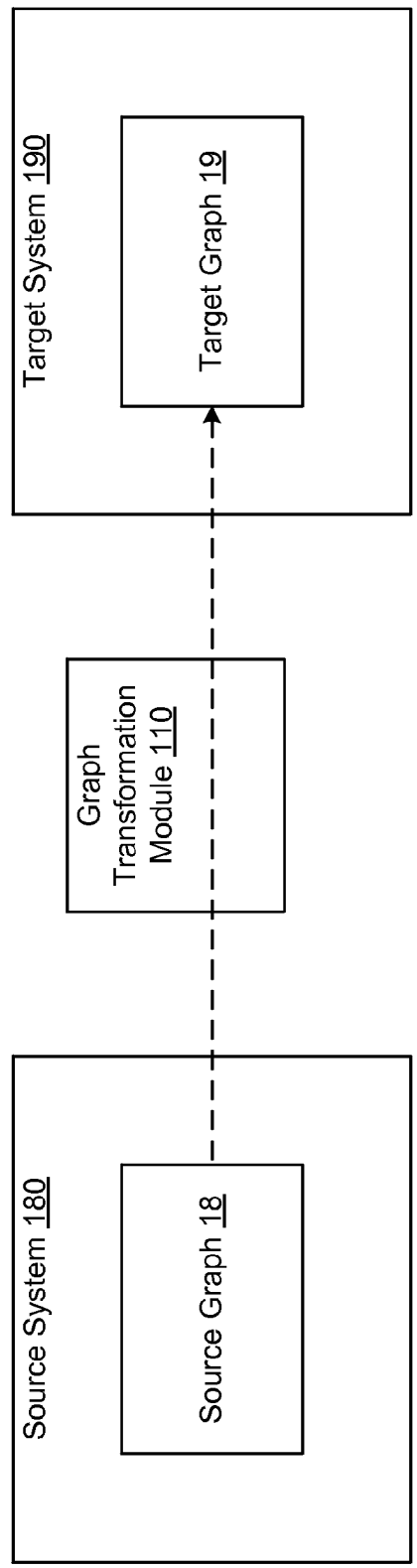
FIG. 1 is a diagram that illustrates a source system and a target system.

FIG. 1 is a diagram that illustrates a source system 180 and a target system 190. The source system 180 is associated with a source graph 18, and the target system 190 is associated with a target graph 19. Specifically, the source system 180 and the target system 190 are, respectively, configured to (or can be used to) process (e.g., send, receive, manipulate (e.g., modify), store, and/or so forth) the source graph 18 (or graph data representing the source graph 18) and the target graph 19 (or graph data representing the target graph 19).

The target graph 19 is a transformed version of the source graph 18 that is transformed by (e.g., transformed using, converted by) a graph transformation module 110. In other words, the data in the source graph 18 can be the same as (or substantially the same as) the data in the target graph 19, but represented in a different form (e.g., a transformed form) within the target graph 19. For example, nodes included in the source graph 18 may be represented in a different fashion from nodes included in the target graph 19, relationships between nodes included in the source graph 18 may be represented in a different fashion within the target graph 19, and/or attributes (e.g., nodes types, node characteristics, relationship characteristics) included in the source graph 18 may be represented in a different fashion from attributes included in the target graph 19. In some embodiments, the target graph 19 can be referred to as a transformed graph.

In some embodiments, the source graph 18 can be referred to as having a configuration (e.g., transform configuration) different from a configuration of the target graph 19. In some embodiments, the source graph 18 can be referred to as having a mapping or a format different from a mapping or format of the target graph 19. In some embodiments, transformation of the source graph 18 can be referred to as changing the mapping (or configuration) of the source graph 18. In some embodiments, the source graph 18 can be referred to as being mapped to the target graph 19. In some embodiments, at least some of the data (e.g., nodes, relationships, attributes) represented within the source graph 18 may not be represented in the target graph 19. In some embodiments, at least some of the data represented within the target graph 19 may not be represented within the source graph 18.

The source graph 18 can be transformed by the graph transformation module 110 into the target graph 19 so that data of (e.g., included in, represented within) the source graph 18 can be processed at the target system 190. In some embodiments, the target graph 19 can be initially produced (e.g., created) based on a transformed version of the source graph 18 by the graph transformation module 110 (which can be referred to as initial production). The target system 190 may be configured so that the data of the source graph 18 may not be processed at the target system 190 without being transformed into the target graph 19. For example, the target system 190 can be configured to operate based on a platform that is incompatible with a platform of the source system 180. Accordingly, a graph (such as source graph 18) that may be processed at source system 180 may not be compatibly processed at the target system 190 without being transformed. Thus, the graph of the source system 180 may be transformed for processing (e.g., compatible processing) at the target system 190.

The source graph 18 can be synchronized with the target graph 19 by the graph transformation module 110 (after the target graph 19 has been initially produced). Specifically, changes to the source graph 18 can be synchronized (e.g., created, updated, deleted) within the target graph 19 by the graph transformation module 110. For example, a change to the source graph 18 can be transformed by the graph transformation module 110 into a transformed change to the source graph 18. The transformed change to the source graph 18 can be used to update the target graph 19, or can be otherwise incorporated into the target graph 19.

In some embodiments, when the target graph 19 (or a portion thereof) is synchronized with the source graph 18 (or a portion thereof), the target graph 19 may not be identical to a transformed version of the source graph 18. In other words, when the target graph 19 (or a portion thereof) is synchronized with the source graph 18 (or a portion thereof), the target graph 19 may be updated so that the target graph 19 is substantially similar to a transformed version of the source graph 18. In some embodiments, when the target graph 19 (or a portion thereof) is synchronized with the source graph 18 (or a portion thereof), the target graph 19 may be identical to a transformed version of the source graph 18.

The source graph 18 (and the source system 180) can be identified as a source, because the source graph 18 (and the sources 180) is an original version (or system) or an untransformed version of a graph. The target graph 19 (and target system 190) can be identified as a target, because the target graph 19 (and target system 190) is a target of a transformed version of the source graph 18.

As a specific example, the source system 180 can be a system configured to discover network devices, enterprise applications, and/or business processes such as a BMC software Atrium Discovery and Dependency Mapping (ADDM) system. The target system 190 can be a system configured to generate impact relationships for use in a service model such as a BMC Software Configuration Management Database (CMDB) system. Source graph (or portions thereof) produced by (e.g., discovered by) and/or processed using the ADDM system can be transformed into and/or synchronized with target graphs (or portions thereof) produced by and/or processed using the CMDB system using the graph transformation module 110.

As another specific example, the source system 180 can be a first social networking system and the target system 190 can be a second social networking system. The first social networking system may be configured to process graphs that may not be compatibly processed by the second social networking system. The graphs of the first social networking system may be transformed and/or synchronized by the graph transformation module 110 so that the graphs can be compatibly processed by the second social networking system. A graph of a social network can include nodes representing users (or user accounts), and relationships within the graph can represent relationships between the users. In some embodiments, the source system 180 and or the target system 190 can be related to, for example, document management systems, and/or so forth.

The source graph 18 and the target graph 19 can be stored as (or represented as) graph data rather than as tabular data in relational database or comma-separated value (CSV) files, or another type of data (e.g., extensible markup language (XML) data), that is adapted to represent one or more graphs. In other words, the source graph 18 and the target graph 19 are represented within graph storage models that directly represent nodes, relationships between nodes, and/or attributes included within the graphs. Said differently, the source graph 18 and/or the target graph 19 may be represented without using tabular data that is linked, for example, through database keys or other metadata to represent nodes and relationships between nodes.

Because the source graph 18 and the target graph 19 are stored as graph data, transformation and/or synchronization performed by the graph transformation module 110 can be performed on the graph data. Thus, transformations and/or synchronizations may be directly performed as graph-to-graph transformations and/or synchronizations, rather the transformations and/or synchronizations performed on tabular data, or another type of data, that is adapted to represent one or more graphs. In some instances, the synchronization and/or transformation operations performed by the graph transformation module 110 may be impossible to perform on, for example, tabular data, and may only be performed on (e.g., performed efficiently on) graph data. More details related to the operations performed by the graph transformation module 110 are described below.

Although not shown, in some embodiments, at least a portion of the target graph 19 can be transformed for processing (e.g., compatible processing) at the source system 180 as a part of the source graph 18. In some embodiments, changes to the target graph 19 can be synchronized with the source graph 18. In such embodiments, the target graph 19 can function as a source graph in the source graph 18 can function as a target graph.

Although not shown in FIG. 1, in some embodiments, the target graph 19 can be associated with one or more graphs that are native to the target system 190. In other words, the target graph 19 can be combined with a graph that is originally associated with (e.g., defined for processing at) the target system 190. In such embodiments, the graph transformation module 110 can be configured to transform the graph that is originally associated with a target system 190 for processing at the source system 180. The transformed version of the graph can be associated with (e.g., combined with) the source graph 18. Also, in such embodiments, changes to the graph at the target system 190 can be transformed used to update (or can be otherwise incorporated into) the source graph 18, or a portion thereof.

In some embodiments, the graph transformation module 110 can be one or more scripts, or can be configured to implement one or more scripts. For example, a transformation script can be configured to transform at least a portion of the source graph 18 into a portion of the target graph 19. As another example, a synchronization script can be configured to synchronize at least a portion of the source graph 18 with a portion of the target graph 19. In some embodiments, one or more of the scripts can be, for example, executable modules. More details related to scripts of the graph transformation module 110 are discussed in connection with, for example, FIGS. 10 through 12.

Figure 2A:
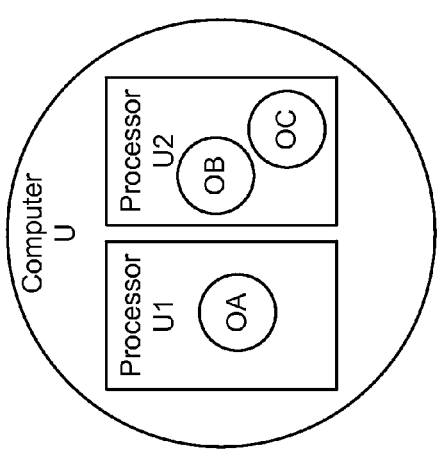
FIG. 2A is a diagram that illustrates a source graph.
Figure 2B:
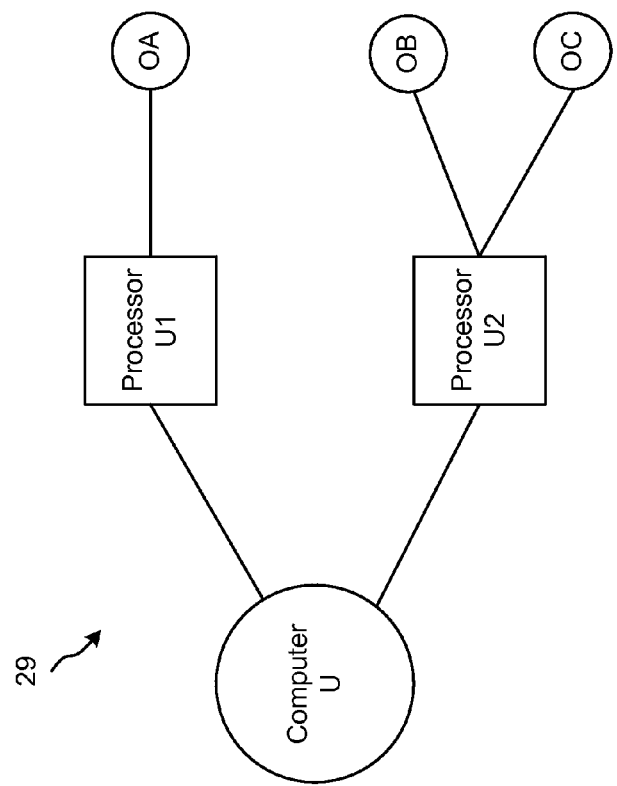
FIG. 2B is a diagram that illustrates a target graph that is a transformed version of the source graph.

FIG. 2A is a diagram that illustrates a source graph 28. FIG. 2B is a diagram that illustrates a target graph 29 that is a transformed version of the source graph 28. As shown in FIG. 2A, the source graph 28 includes computer U, which is a single node, with two processors—processor U1 and processor U2. The processor U1 is executing a single process, process OA, and the processor U2 is executing two processes, process OB and process OC. As shown in FIG. 2A, the computer U is represented as a single node within the source graph 28, and the processors U1, U2 and processes OA, OB, and OC executing within the processors U1, U2 are represented as being included within the computer U. In some embodiments, the processors U1, U2 and processes OA, OB, and OC executing within the processors can be represented as, for example, attributes of computer U.

As shown in FIG. 2B, in the target graph 29, the computer U, the processors U1, U2, and the processes OA, OB, OC are each represented as separate nodes. Specifically, processors U1 and U2 are each represented as nodes having a relationship (e.g., a link) (represented by lines) with the computer U. The process OA is represented as a node having a relationship (represented by a line) with the processor U1, and the processes OB an OC are each represented as nodes having a relationship (represented by lines) with processor U2. When transformed from the source graph 28, the processors U1, U2, and the processes OA, OB, OC are extracted from the computer U and represented as individual nodes. In some embodiments, the transformation from the source graph 28 to the target graph 29 can be performed by a graph transformation module such as graph transformation module 110 shown in FIG. 1.

Although not shown in FIGS. 2A and 2B, in some embodiments, additional attributes and/or nodes can be associated with any of the components illustrated within these figures. For example, additional attributes (e.g., process type, process duration, etc.) can be related to the processes OA, OB, and/or OC. As another example, additional attributes (e.g., processor type, processor speed, internal memory capacity, core processor capabilities, etc.) can be related to the processors U1 and/or U2. In some embodiments, networks and/or other computers can be associated with computer U, and/or a portion thereof.

Figure 3:
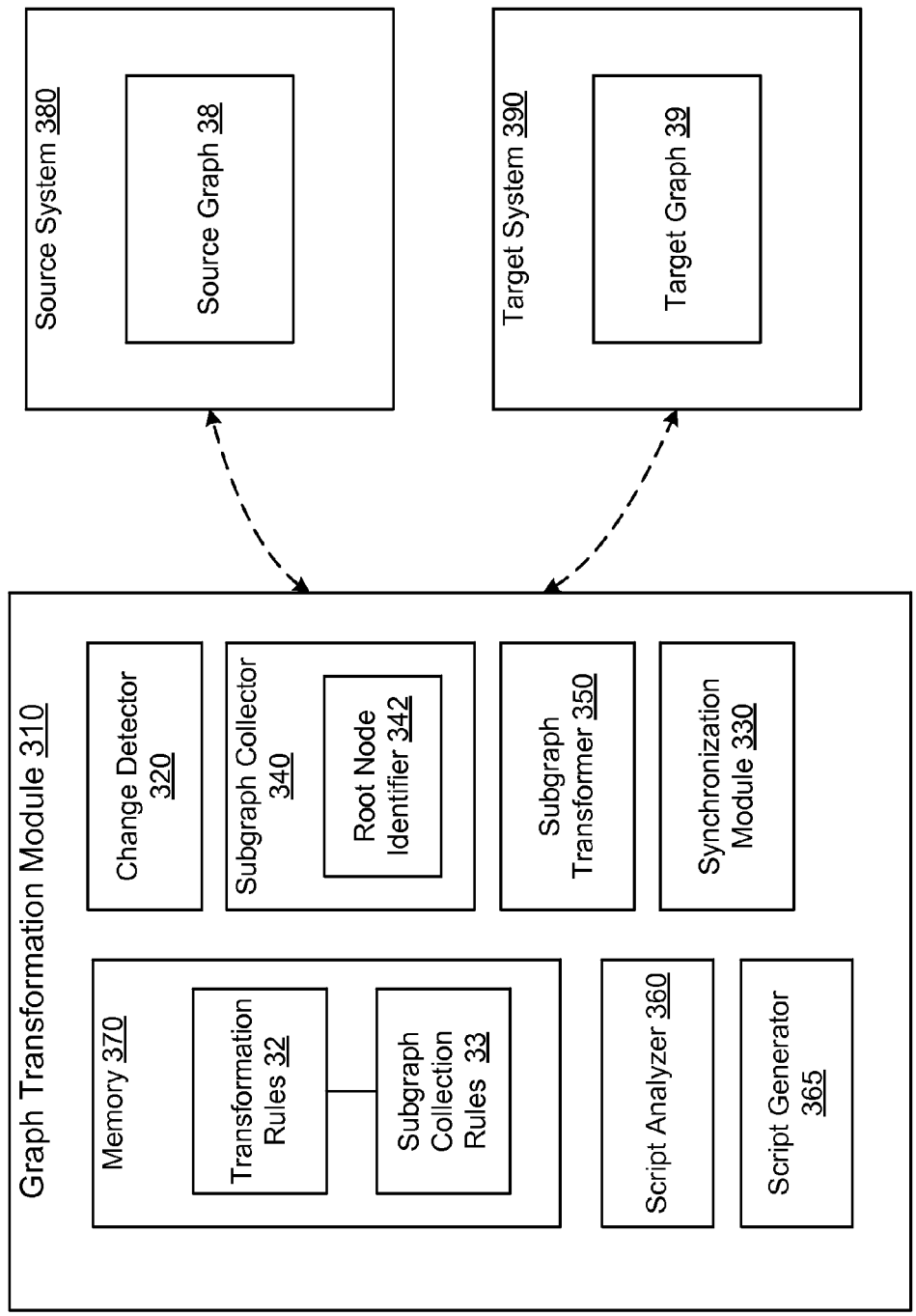
FIG. 3 is a diagram that illustrates a graph transformation module, according to an embodiment.

FIG. 3 is a diagram that illustrates a graph transformation module 310, according to an embodiment. In this embodiment, the graph transformation module 310 is configured to define at least a portion (e.g., a subgraph) of a target graph 39 associated with a target system 390 based on a source graph 38 associated with a source system 380. Specifically, the graph transformation module 310 is configured to initially define a transformed version of the source graph 38 as the target graph 39. In other words, the target graph 39 can be initially produced (e.g., created) by transforming the source graph 38.

After the target graph 39 has been defined (e.g., initially produced), changes to the source graph 38 (via the source system 380) can be synchronized with the target graph 39. In some embodiments, portions (e.g., subgraphs) of the target graph 39 can be modified based on changes to the source graph 38. For example, one or more nodes, relationships between the one or more nodes, and/or attributes can be added to or deleted from the target graph 39 based on changes to the source graph 38.

In this embodiment, initial production of the target graph 39 and/or synchronization of the target graph 39 can be performed based on subgraphs of the source graph 38. A subgraph can be a portion of a graph. A subgraph of the source graph 38 can be referred to as a source subgraph, and a subgraph of the target graph 39 can be referred to as a target subgraph. For example, if the source graph 38 includes 100 nodes, a source subgraph of the source graph 38 can include less than all of the nodes of the source graph 38. Initial production of the target graph 39 can be performed by transforming the source subgraph of the source graph 38 and including the transformed source subgraph as part of the target graph. Synchronization of the target graph 39 can be performed based on a transformed version of the source subgraph of the source graph 38.

The graph transformation module 310 includes a subgraph collector 340 configured to identify and retrieve a source subgraph from the source graph 38 and/or a target subgraph from the target subgraph 39. The collection of a subgraph can start with a root node identified by a root node identifier 342 of the subgraph collector 340. Nodes, relationships, and/or attributes associated with the root node can be collected (e.g., used to define) the subgraph. In some embodiments, the root node and nodes, relationships, and/or attributes associated with the root node can be collected to define a subgraph based on one or more subgraph collection rules 33 stored in a memory 370. In some embodiments, collection of a subgraph may not include actual retrieval of graph data related to the subgraph, but can include identification of graph data representing nodes, relationships between nodes, and/or attributes associated with the subgraph.

For example, a subgraph collection rule (from the subgraph collection rules 33) indicating that each host computer included within a graph representing a computer network should be identified as a root node. The subgraph collection rule can also indicate that each client computer having access to the host computer should be collected as subgraphs. Accordingly, subgraphs representing portions of the computer network can be collected from the graph representing the computer network.

As shown in FIG. 3, the graph transformation module 310 includes a subgraph transformer 350. Subgraph transformer 350 is configured to transform source subgraphs into transformed subgraphs (which can be referred to as transformed source subgraphs) that can be included in (e.g., included in an initial production of) and/or synchronized with at least a portion of the target graph 39. The graph data of the source graph 38 (e.g., the tree structure of the source graph 38) can be traversed to produce the target graph 39.

Transformations can be performed by the subgraph transformer 350 based on one or more transformation rules 32 stored in the memory 370. The transformation rules 32 can indicate a manner in which nodes, relationships between nodes, and/or attributes may be handled (e.g., modified) when transforming a source subgraph into a target subgraph (which is a transformed version of the source subgraph). In some embodiments, one or more of the transformation rules 32 can be integrated into (e.g., integrated into instructions, scripts, code, etc.) the subgraph transformer 350.

For example, one or more transformation rules 32 can be used to transform attributes of a node in the source graph 38 into nodes for the target graph 39. As another example, one or more transformation rules 32 can be used to define a relationship between nodes for the target graph 39 from a portion of the source graph 38 that does not include the relationship between the nodes. In some embodiments, one or more transformation rules 32 can be configured to group and/or ungroup nodes of the source graph 38 for the target graph 39. More details related to grouping nodes are discussed in connection with, for example, FIGS. 12A and 12B.

As illustrated by the line between the transformation rules 32 and the subgraph collection rules 33, the transformation rules 32 can be related to the subgraph collection rules 33. For example, one or more of the subgraph collection rules 33 can be defined so that a subgraph of the source graph 38 can be collected and can be efficiently transformed using one or more of the transformation rules 32. As a specific example, if a transformation rule from the transformation rules 32 is related to transformation of a particular type of node, one or more of the subgraph collection rules 33 can be defined so that a subgraph can be collected by the subgraph collector 340 using the particular type of node as a root node. Thus, the transformation rule can be efficiently implemented by the subgraph transformer 350 to perform a transformation of the particular type of node. In some embodiments, one or more of the subgraph collection rules 33 can be integrated into (e.g., integrated into instructions, scripts, code, etc.) the subgraph collector 340.

In some embodiments, one or more subgraph collection rules 33 can be defined based on (e.g., derived from) one or more transformation rules 32. For example, a transformation rule from the transformation rules 32 can be used to define a subgraph collection rule from the subgraph collection rules 33 so that a subgraph of the source graph 38 can be collected and can be efficiently transformed using the transformation rules.

In the case of initial production of the target graph 39, portions of the target graph 39 can be produced based on source subgraphs of the source graph 38 that are collected by the subgraph collector 340 based on one or more subgraph collection rules 33 and are transformed by the subgraph transformer 350 based on one or more transformation rules 32. For example, a source subgraph of the source graph 38 can be collected by the subgraph collector 340 based on a subgraph collection rule from the subgraph collection rules 33. The source subgraph can be transformed by the subgraph transformer 350 based on a transformation rule from the transformation rules 32. In some embodiments, the transformation rule can correspond with the subgraph collection rule. The transformed source subgraph can define (or can be used to define) at least a portion of the target graph 39. An example of initial production of a target graph based on a source graph is shown in FIGS. 4A through 4C.

Figure 4A:
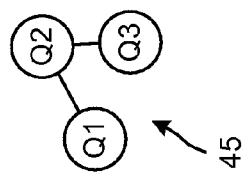
FIGS. 4A through 4C illustrate an example of initial production of a target graph based on a source graph.

FIG. 4A is a diagram that illustrates a source graph 48. In response to an instruction to produce a target graph, a root node Q1 is identified within the source graph 48. The root node Q1 can be identified by the root node identifier 342 based one or more of the subgraph collection rules 33 shown in FIG. 3. Starting with the root node Q1, a source subgraph 44, which includes nodes Q2 and Q3 is identified within (e.g., collected from) the source graph 48. The source subgraph 44 can be identified based on one or more of the subgraph collection rules 33 by the subgraph collector 340 shown in FIG. 3.

Figure 4B:
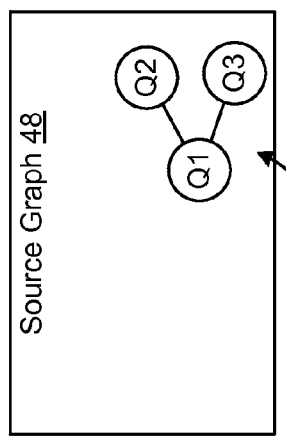

After the source subgraph 44 has been identified, the source subgraph 44 is transformed into the transformed source subgraph 45 shown in FIG. 4B. The source subgraph 44 can be transformed into the transformed source subgraph 45 by the subgraph transformer 350 based on one or more of the transformation rules 32 shown in FIG. 3. In this embodiment, a relationship between Q1 and Q3 is removed (e.g., deleted) from the source subgraph 44 and a relationship between Q2 and Q3 is added to the source subgraph 44 to define the transformed source subgraph 45.

Figure 4C:
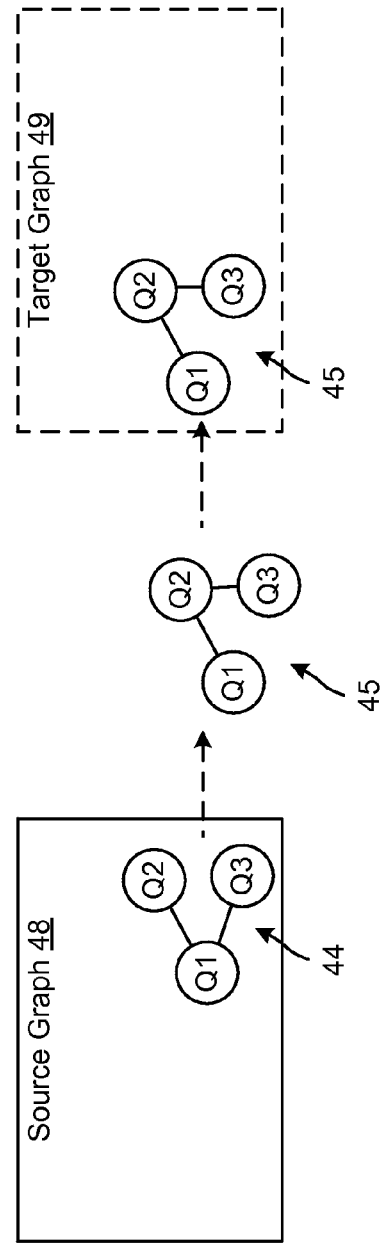

As represented within FIG. 4C, the transformed source subgraph 45 defines (or is used to define) at least a portion of a target graph 49. Although not shown in FIGS. 4A through 4C, additional nodes and/or relationships between nodes may exist within the source graph 48 and/or the target graph 49.

Referring back to FIG. 3, in the case of synchronization of the target graph 39 to the source graph 38, changes to the source graph 38 that are to be synchronized with the target graph 39 (e.g., an existing target graph) can be detected by a change detector 320 of the graph transformation module 310. For example, a node within the source graph 38 that has changed in response to, for example, an action triggered by a user of the source system 380 can be detected by the change detector 320. The change of the source graph 38 that is detected by the change detector 320 can be synchronized (or can be used to synchronize) the target graph 39 with the source graph 38.

As a specific example, an indicator of a change to the source graph 38 can be produced by the change detector 320. The indicator can be configured to trigger the subgraph collector 340 to collect a source subgraph related to the change to the source graph 38. The source subgraph can be collected so that the change to the source graph 38 is included in the source subgraph. Specifically, a source root node of the subgraph can be selected and used as a root of the source subgraph so that source subgraph will include the change to the source graph 38. The source subgraph related to the change to the source graph 38 can be transformed by the subgraph transformer 350 into a transformed source subgraph.

After the transformed source subgraph has been defined based on the source subgraph collected from the source graph 38 by the subgraph transformer 350, a target root node of the target graph 39 corresponding with the source root node of the source subgraph of the source graph 38 can be identified within the target graph 39 (by the root node identifier 342). Starting from the target root node, a target subgraph of the target graph 39 can be collected (or identified) from the target graph 39. The target subgraph can be synchronized with the transformed source subgraph by a synchronization module 330 of the graph transformation module 310 so that the target subgraph will match the transformed source subgraph. In some embodiments, synchronization can be performed by the synchronization module 330 based on a key (e.g., node or other indicator) of the changed portion of the source graph 38 matching with a key of a portion of the target graph 39.

In some embodiments, the synchronization module 330 can be configured to synchronize one or more nodes, one or more relationship between nodes, and/or attributes associated with nodes (or relationships) so that the target subgraph will match the transformed source subgraph. In some embodiments, the synchronizing performed by the synchronization module 330 can include any type of modification such as adding, deleting, updating, and/or so forth. Because the target subgraph of the target graph 39 is already transformed relative to the source graph 38, the target subgraph of the target graph 39 is not transformed before being compared with the transformed source subgraph of the source graph 38. An example of synchronization of a target graph within a source graph is shown in FIGS. 5A through 5E.

Figure 5A:
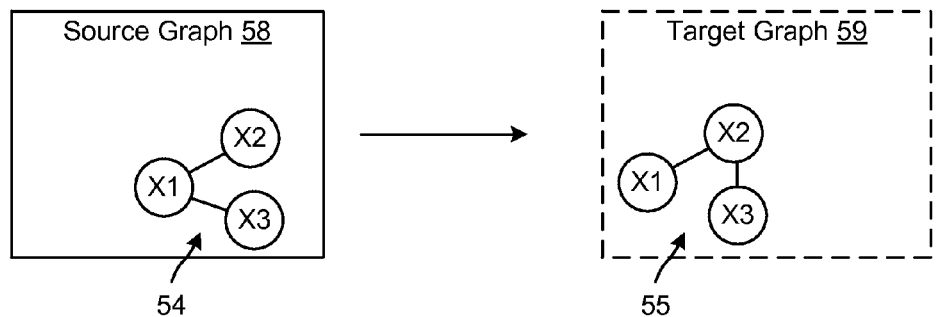
FIGS. 5A through 5E illustrate an example of synchronization of a target graph within a source graph.

FIG. 5A is a diagram that illustrates a source graph 58 including a source subgraph 54. The source subgraph 54 includes nodes X1 through X3, where node X1 has a relationship with node X2 and a relationship with node X3. FIG. 5A also illustrates a target graph 59 including a target subgraph 55 that is a transformed version of the source subgraph 54. The target subgraph 55 also includes nodes X1 through X3, but the node X1 only has a relationship with node X2, and node X2 has a relationship with note X3.

Figure 5B:
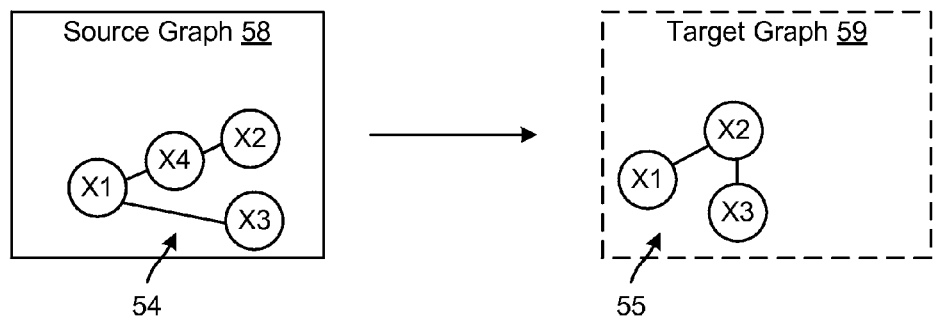

As shown in FIG. 5B, the source graph 58 is modified. Specifically, the source subgraph 54 is modified to include node X4 between nodes X1 and X2. The change to the source subgraph 54 of the source graph 58 can be detected by, for example, the change detector 320 of the graph transformation module 310 shown in FIG. 3.

Figure 5C:
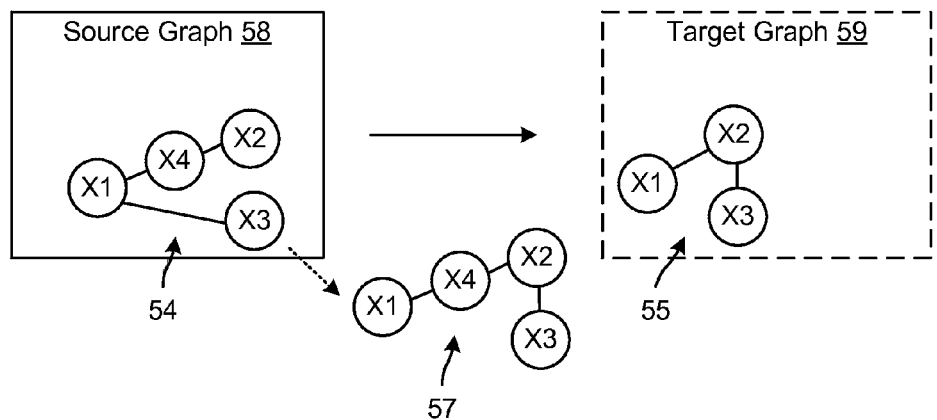
Figure 5D:
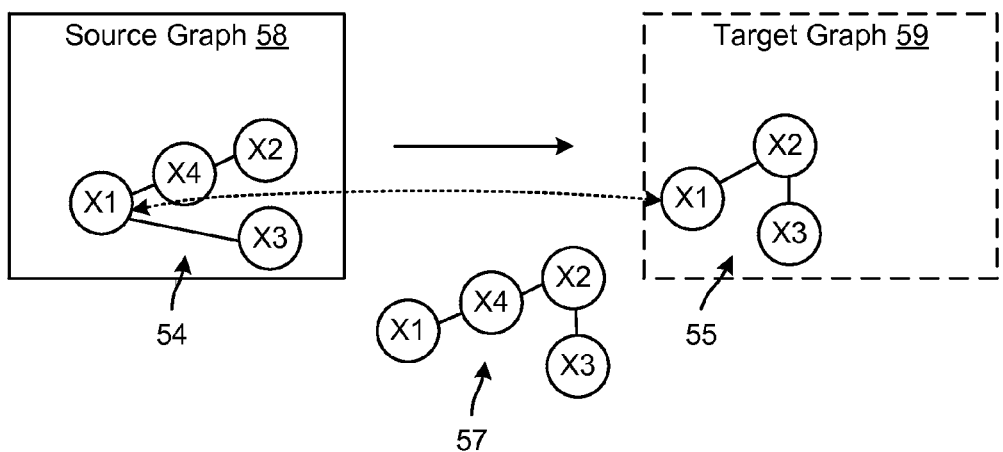

In response to the change to the source subgraph 54, a transformed source subgraph 57 is defined as shown in FIG. 5C. The source subgraph 54 can be transformed into the transformed source subgraph 57 by the subgraph transformer 350 based on one or more of the transformation rules 32 shown in FIG. 3. In this embodiment, a relationship between X1 and X3 is deleted from the source subgraph 54 and a relationship between X2 and X3 is added to the source subgraph 54 to define the transformed source subgraph 57.

In some embodiments, a root node of the source subgraph 54 can be identified within the source graph 58 so that the transformed source subgraph 57 can be defined using the same root node as that of the source subgraph 54. In this embodiment, the root node can be node X1. The root node X1 can be identified by the root node identifier 342 based one or more of the subgraph collection rules 33 shown in FIG. 3 and based on the portion of the source graph 58 that has been modified. In some embodiments, the source subgraph 54 can be identified based on one or more of the subgraph collection rules 33 by the subgraph collector 340 shown in FIG. 3.

After the transformed source subgraph 57 has been defined, a node in the target graph 59 that corresponds with the root node X1 in the source graph 58 is identified. In this embodiment, the node X1 in the target graph 59 corresponds with the root node X1 of the source graph 58 (as represented by the dashed double arrow). The correspondence between the root node X1 of the source graph 58 and the node X1 and the target graph 59 is identified so that a target subgraph of the target graph 59 that corresponds with the transformed source subgraph 57 can be identified and compared with the transformed source subgraph 57.

Based on the node X1 from the target graph 59 and based on one or more subgraph collection rules 33 shown in FIG. 3, a target subgraph 55 is identified (e.g., collected) within the target graph 59. After the target subgraph 55 has been identified, the target subgraph 55 can be compared with the transformed source subgraph 57. In some embodiments, the target subgraph 55 can be compared with the transformed source subgraph 57 so that the target subgraph 55 can be updated with any changes in the transformed source subgraph 57.

Figure 5E:
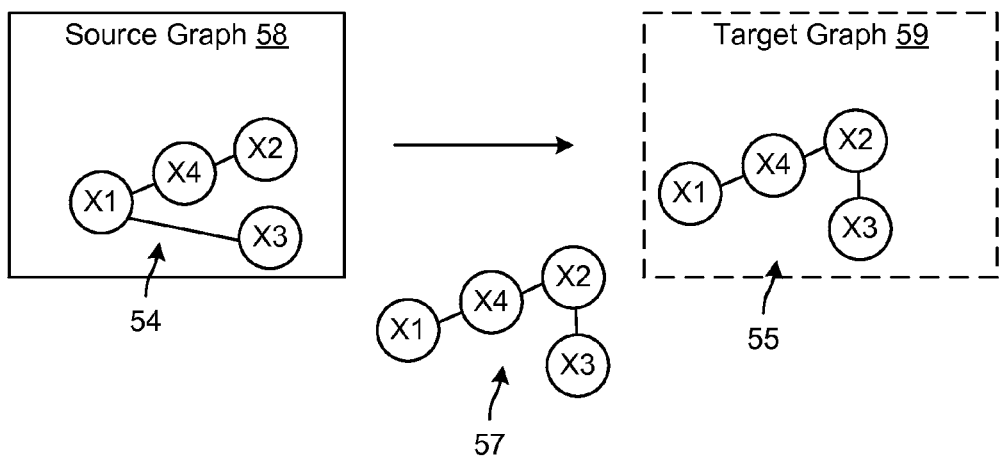

As represented within FIG. 5E, the target subgraph 55 is updated with the changes in the transformed source subgraph 57. In some embodiments, the target subgraph 55 of the target graph 59 can be replaced with (e.g., can be replaced with an instance of) the transformed source subgraph 57. In some embodiments, comparison of the target subgraph 55 with the transformed source subgraph 57 and/or modification of the target subgraph 55 based on the transformed source subgraph 57 can be performed by the synchronization module 330 of the graph transformation module 310 shown in FIG. 3.

Although not shown in FIGS. 5A through 5E, in some embodiments, if a node of a target graph corresponding to a source root node (of a changed portion) of a source graph is not found in the target graph, the transformed source subgraph can be identified as being a subgraph that is new to the target graph. In such embodiments, the transformed subgraph can be added to the target graph as a new portion of the target graph.

Although not shown in FIGS. 5A through 5E, if a node of a target graph corresponding to a source root node (of a changed portion) of a source graph is not found in the target graph, a search for a target subgraph of the target graph that may have portions that match with any portion of the transformed source subgraph can be conducted. If a match (excluding the source root node) between at least a portion of the transformed source subgraph is found in a target subgraph of the target graph, the target subgraph may be modified based on the transformed source subgraph.

Also, although not shown in FIGS. 5A through 5E, if a transformed source subgraph matches a target subgraph, the target subgraph may not be updated and the transformed source subgraph can be discarded. The target subgraph may not be modified because the target subgraph already matches with the transformed source subgraph and synchronization may not be needed. Although not shown in FIGS. 5A through 5E, additional nodes, relationships between nodes, and/or attributes may exist within the source graph 58 and/or the target graph 59.

Some portions of the procedure shown in FIGS. 5A through 5B can be performed in a different order. For example, a node from the target graph 59 corresponding with the root source node X1 of the source graph 58 can be identified before the source subgraph 54 is transformed to define the transformed source subgraph 57.

In some implementations, the graph transformation module 310 can be configured to operate at a host device. In such implementations, the graph transformation module 310 can be configured to access, through a network, the source system 380 and/or the target system 390. In some embodiments, the functionality of the graph transformation module 310 can be called and/or executed on an on-demand basis (e.g., in response to the event data 35). In some implementations, the graph transformation module 310 can function as a background application operating in conjunction with the source system 380 and/or the target system 390. In some implementations, the graph transformation module 310 can function as an application (or service) that can be accessed via an application programming interface (API).

The graph transformation module 310 can be, or can include, any type of hardware and/or software configured to process graph data, send notifications, and process feedback. In some implementations, one or more portions of the components shown in the graph transformation module 310 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the graph transformation module 310 can be, or can include, a software module configured for execution by at least one processor (not shown). In some implementations, the functionality of the components can be included in different modules and/or different components than those shown in FIG. 3. For example, although not shown, the functionality of the subgraph collector 342 can be included in a different module than the subgraph collector 342, or divided into several different modules.

Although not shown, in some implementations, the graph transformation module 310 (or portions thereof), the source system 380 (or portions thereof), and/or the target system 390 (or portions thereof) can be configured to operate within, for example, a data center (e.g., a cloud computing environment), a computer system, one or more server/host devices, and/or so forth. In some implementations, the graph transformation module 310 (or portions thereof), the source system 380 (or portions thereof), and/or the target system 390 (or portions thereof) can be configured to operate within a network. Thus, the graph transformation module 310 (or portions thereof), the source system 380 (or portions thereof), and/or the target system 390 (or portions thereof) can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The graph transformation module 310, the source system 380, and/or the target system 390 can be configured to operate based on one or more platforms (e.g., one or more similar or different platforms) that can include one or more types of hardware, software, firmware, operating systems, runtime libraries, and/or so forth. In some implementations, the graph transformation module 310, the source system 380, and/or the target system 390 can represent a cluster of devices (e.g., a server farm). In such an implementation, the functionality and processing of the graph transformation module 310, the source system 380, and/or the target system 390 can be distributed to several devices of the cluster of devices.

Although not shown, in some implementations, the memory 370 can be implemented as more than one memory component (e.g., more than one random-access memory (RAM) component or disk drive memory) associated with the graph transformation module 310. In some implementations, the memory 370 can be a database memory. In some implementations, the memory 370 can be, or can include, a non-local memory. For example, the memory 370 can be, or can include, a memory shared by multiple devices (not shown). In some implementations, the memory 370 can be associated with a server device (not shown) within a network and configured to serve the graph transformation module 310.

Figure 6:
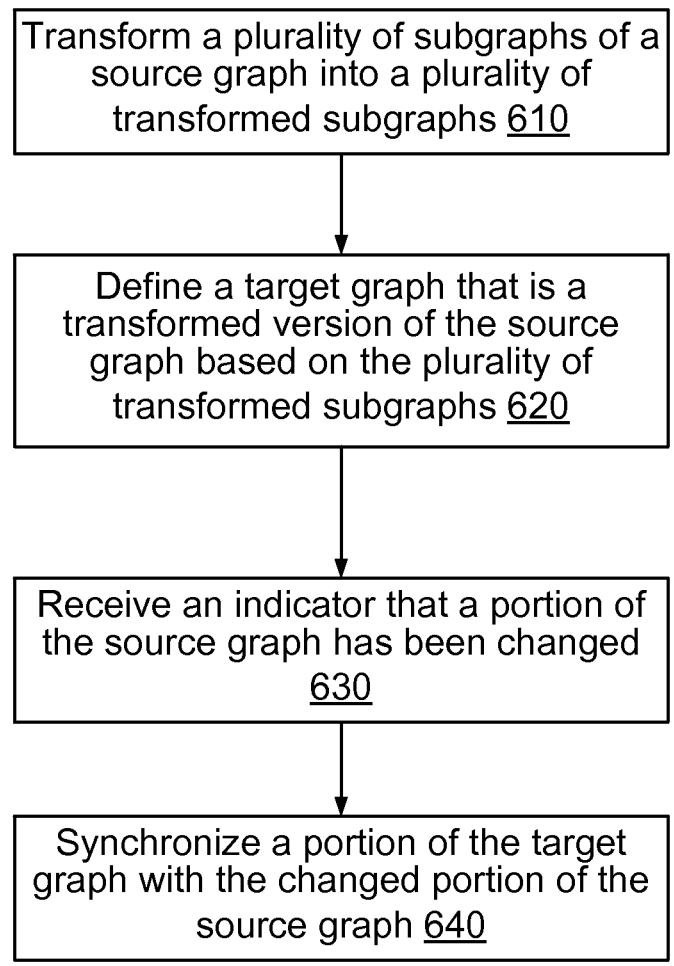
FIG. 6 is a flowchart that illustrates a method for synchronizing a target graph with a source graph.

FIG. 6 is a flowchart that illustrates a method for synchronizing a target graph with a source graph. At least some portions of the method shown in FIG. 6 can be performed by, for example, one or more portions of the graph transformation module 310 shown in FIG. 3.

A plurality of subgraphs of a source graph are transformed into a plurality of transformed subgraphs (block 610). In some embodiments, each subgraph from the plurality of subgraphs of the source graph is collected based on one or more subgraph collection rules (e.g., subgraph collection rules 33 shown in FIG. 3), and one or more transformation rules (e.g., transformation rules 32 shown in FIG. 3).

A target graph that is a transformed version of the source graph is defined based on the plurality of transformed subgraphs (block 620). In some embodiments, one or more of the plurality of transformed subgraphs are coupled (via relationships) to form the target graph. The target graph can be initially produced based on the plurality of subgraphs of the source graph. The target graph can be compatibly processed by a target system that may not be configured to process the source graph.

An indicator that a portion of the source graph has been changed is received (block 630). In some embodiments, the indicator can be produced by the change detector 320 shown in FIG. 3. In some embodiments, one or more nodes of the source graph and/or one or more relationships between nodes of the source graph can be changed.

A portion of the target graph is synchronized with the changed portion of the source graph (block 640). In some embodiments, the portion of the target graph can be a subgraph that is synchronized with the portion of the source graph. In some embodiments, the portion of the source graph can be a subgraph that is transformed and compared with the portion of the target graph, which can also be a subgraph. The portion of the target graph can be updated with changes to the transformed subgraph of the source graph.

Figure 7:
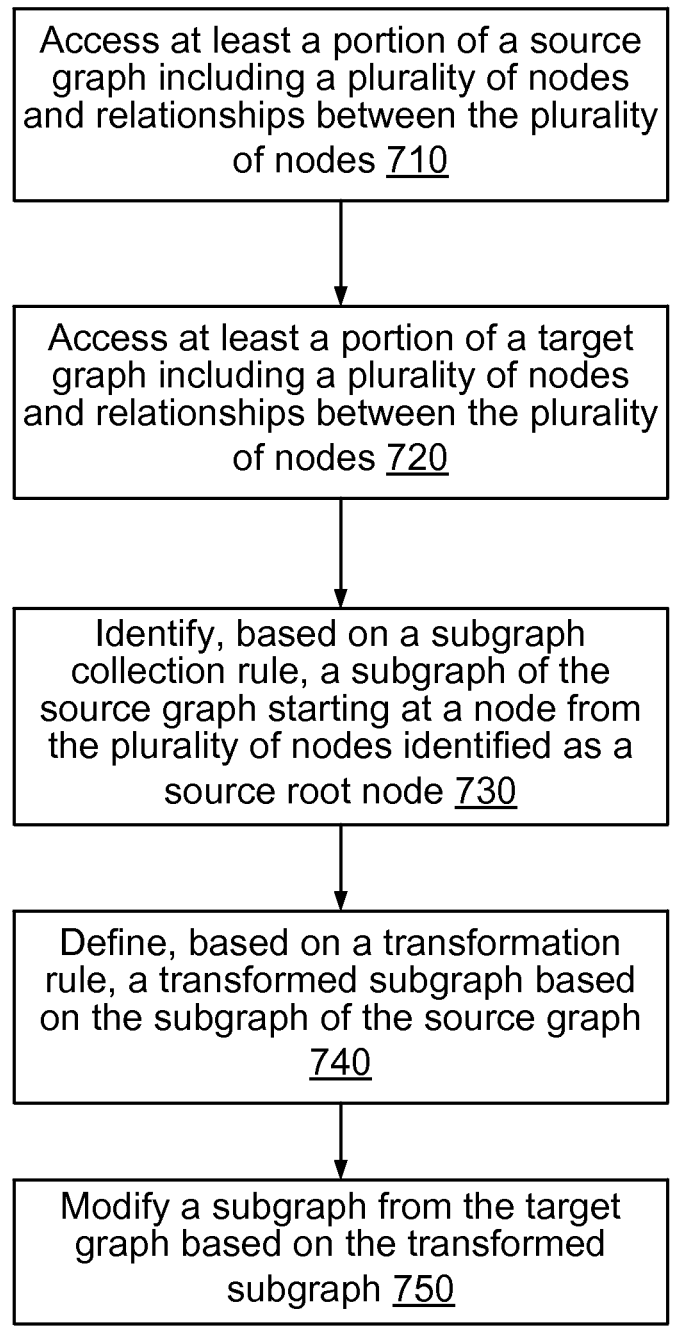
FIG. 7 is a flowchart that illustrates another method for synchronizing a target graph with a source graph.

FIG. 7 is a flowchart that illustrates another method for synchronizing a target graph with a source graph. At least some portions of the method shown in FIG. 7 can be performed by, for example, one or more portions of the graph transformation module 310 shown in FIG. 3.

At least a portion of a source graph including a plurality of nodes and relationships between the plurality of nodes is accessed (block 710). In some embodiments, the plurality of nodes and relationships between the plurality of nodes of the source graph can be stored (e.g., stored at a source system) or represented using graph data.

At least a portion of a target graph including a plurality of nodes and relationships between the plurality of nodes is accessed (block 720). In some embodiments, the plurality of nodes and relationships between the plurality of nodes of the target graph can be stored (e.g., stored at a target system) or represented using graph data.

A subgraph of the source graph starting at a node from the plurality of nodes identified as a source root node is identified based on a subgraph collection rule (block 730). In some embodiments, the subgraph collection rule can be one or more of the subgraph collection rules 33 shown in FIG. 3. In some embodiments, the source root node can be identified based on a type of transformation that will be performed on the subgraph of the source graph. In other words, the type of transformation that is performed on the subgraph of the source graph can dictate which node from the source graph is selected as a source root node. Also, the nodes and/or relationships between nodes included in the subgraph can be selected based on the transformation that is performed on the subgraph of the source graph.

A transformed subgraph is defined based on a transformation rule and based on the subgraph of the source graph (block 740). In some embodiments, the transformed subgraph can be referred to as a transformed source subgraph. In some embodiments, the transformation rule can be, for example, one or more of the transformation rules 32 shown in FIG. 3. In some embodiments, the transformation rule can be used to derive the subgraph collection rule described above.

A subgraph from the target graph is modified based on the transformed subgraph (block 750). In some embodiments, the subgraph of the target graph (which can be referred to as a target subgraph) can be identified (e.g., collected) based on one or more subgraph collection rules such as the subgraph collection rule described above in connection block 730. In some embodiments, the subgraph of the target graph can be identified based on a root node that corresponds with the source root node described in connection with block 730.

FIG. 8A is a diagram that illustrates a target subgraph that is a transformed version of a source subgraph. As shown in FIG. 8A, the source subgraph includes a Host V having a relationship with two nodes—Apache Program W and a VMware Program X. In the target subgraph shown in FIG. 8A, the Host V is transformed to a System V' and the Apache Program W is transformed into an Apache Server W'. The VMware Program X is transformed into two different nodes—VMware Server X' and VMware Enabler X'. In some embodiments, the source subgraph and the target subgraph shown in FIG. 8A can be respectively referred to as an original (or prior) source subgraph and as an original (or prior) target subgraph.

FIG. 8B is a diagram that illustrates the source subgraph shown in FIG. 8A after being modified. Specifically, the source subgraph is modified so that the VMware Program X is no longer included in the source subgraph. In other words, the VMware Program X is removed from the source subgraph as shown in FIG. 8B. In some embodiments, the source subgraph can be referred to as a modified source subgraph (or as a changed source subgraph) after the change.

If a log of (e.g., a log file of, a record, a log detailing, a history file) the change to the source subgraph is available, the removal of the VMware Program X from the source subgraph to produce the modified source subgraph shown in FIG. 8B can be determined. The information about the removal can be used in conjunction with a transformed version of the modified source subgraph to remove from the target subgraph the VMware Server X' and the VMware Enabler X', which were both derived from the VMware Program X (which is no longer included in the source subgraph). The target subgraph (which can be referred to as a synchronized target subgraph or as a modified target subgraph) without the VMware Server X' in the VMware Enabler X' is shown in FIG. 8C. Thus, the target subgraph shown in FIG. 8A can be synchronized with the modified source subgraph shown in FIG. 8B to produce the synchronized target subgraph shown in FIG. 8C based on a log of the change to the source subgraph.

If a log of the change to the source subgraph is not available, synchronizing the target subgraph with the changed source subgraph can be performed based on one or more class graphs (or class subgraphs). The class graph can be a representation (e.g., a generic representation) that includes classes (e.g., types) of nodes (which can be referred to as potential nodes or as projected nodes) that have a probability (e.g., possibility) of being included in the source subgraph, and/or have a probability (e.g., possibility) of being derived from (e.g., transformed from) the source subgraph for the target subgraph. In some embodiments, the class graph can include all of the possible classes of nodes (e.g., potential nodes), relationships, and/or so forth that could have been included in (e.g., have a probability of being included in) a source subgraph and/or a target subgraph. The class graph can also include all of the possible classes of nodes (e.g., potential nodes), relationships, and/or so forth that can be included in (or should be removed from) the target subgraph (after being derived from the source subgraph). In some embodiments, the class graph can include all of the possible classes of nodes (e.g., potential nodes), relationships, and/or so forth that may have been included in (e.g., have a probability of being included in) the source graph, but are currently excluded (e.g., deleted) from the source graph after the source subgraph has been modified.

In some embodiments, a class graph can be produced using a script (e.g., a class script). In some embodiments, a class graph can be produced (e.g., inferred) based on transformations of nodes, relationships, and/or attributes defined within a transformation script. In some embodiments, a class graph can be represented as a script (e.g., a class script) that can be executed during synchronization of a target subgraph with a source subgraph. In some embodiments, one or more class graphs (or subgraphs) can be produced by a class graph definition module (e.g., produced by a class graph definition module based on a transformation script).

In this example embodiment, because the VMware Program X is no longer part of the modified source subgraph shown in FIG. 8B, the VMware Server X' and the VMware Enabler X' may not be properly removed from the original target subgraph (shown in FIG. 8A) without information indicating that the original source subgraph (shown in FIG. 8A) included a precursor (to the VMware nodes) that has since been removed from the modified source subgraph. In other words, the class graph can be used as a reference to determine one or more nodes, relationships, and/or attributes (and/or derivations thereof) that have been removed from the original source subgraph to produce the modified source subgraph, and should also be removed (e.g., removed after being transformed) from the original target subgraph to produce the synchronized subgraph.

FIG. 8D is a diagram that illustrates a source class graph related to the source subgraph shown in FIG. 8A (and the source subgraph shown in FIG. 8B). As shown in FIG. 8D, the host 811 (which can be transformed to a system 813 (shown in FIG. 8E)) can be coupled to (e.g., related to) a program class 801 of nodes. The program class 801 can include various instances of nodes of the program class such as, for example, a VMware Program, an Apache Program, and so forth. The program class 801 of nodes that can be coupled to the host 811 are illustrated with dashed lines. Although additional classes (e.g., types) of nodes are not shown in FIG. 8D, a source class graph can include other classes of nodes (other than the program class 801) that can be associated with a root node such as the host 811.

FIG. 8E is a diagram that illustrates a target class graph that can be derived from the source class graph shown in FIG. 8D (e.g., transformed from the source class graph by the subgraph transformer 350 shown in FIG. 3). The program class 801 shown in FIG. 8D can be transformed (depending on the type of instance of the node included in the program class 801) in a server class 803 of nodes and an enabler class 805 of nodes. The server class 803 can include instances of nodes such as a VMware Server (transformed from a VMware Program), an Apache Server (transformed from an Apache Program), and so forth. The enabler class 805 can include instances of nodes such as a VMware Enabler (transformed from a VMware Program). The transformed nodes are illustrated in FIG. 8D with dotted lines. In some embodiments, the source class graph (shown in FIG. 8D) and/or the target class graph (shown in FIG. 8E) can be produced by a class graph definition module (not shown) and/or the subgraph transformer 350 shown in FIG. 3.

As mentioned above, if a log of changes to the source subgraph (from the original source subgraph FIG. 8A to the modified source subgraph FIG. 8B) is not available, the target class graph (shown in FIG. 8E) can be used to determine changes that should be made to the original target subgraph shown in FIG. 8A to arrive at the synchronized target subgraph shown in FIG. 8C. Specifically, the target class graph shown in FIG. 8E can be used to search for instances of each class of nodes that could be included in the original target subgraph shown in FIG. 8A and should be removed from the original target subgraph to arrive at the synchronized target subgraph shown in FIG. 8C. After instances of nodes are identified based on the class graphs, instances of nodes can be removed, if necessary, from the original target subgraph shown in FIG. 8A to produce the modified target subgraph shown in FIG. 8C based on a comparison of the modified source subgraph shown in FIG. 8B (and/or the original source subgraph shown in FIG. 8A, if available) with the original target subgraph shown in FIG. 8A.

For example, because the target class graph includes the server class 803, instances of nodes of the server class 803 can be located (e.g., searched, identified) and removed from the original target subgraph shown in FIG. 8A, if necessary. In this embodiment, the Apache Server W' and the VMware Server X' are included in the original target subgraph shown in FIG. 8A. Because no VMware Program instance from which the VMware Server X' could be derived appears in the original source subgraph (shown in FIG. 8A), the VMware Server X' can be removed when producing the synchronized target subgraph shown in FIG. 8C.

Also, because the target class graph includes the enabler class 805, instances of nodes of the enabler class 805 can be located (e.g., searched, identified) and removed from the original target subgraph shown in FIG. 8A, if necessary. Searching for instances of nodes of the enabler class 805 might not otherwise occur (e.g., be triggered) without the target class graph, which includes the enabler class 805 as an indicator of the possibility of instances of nodes of the enabler class 805. In particular, searching for instances of nodes of the enabler class 805 might not be triggered by an analysis of the modified source subgraph shown in FIG. 8B, because nodes that could be converted into nodes of the enabler class 805 are no longer present in the source subgraph shown in FIG. 8B (and these changes may not be recorded in a log). In this case, the original target subgraph shown in FIG. 8A includes the VMware Enabler X'. Because precursors to the VMware Enabler X' are not present in the modified source subgraph, the VMware Enabler X' is removed from the original target subgraph shown in FIG. 8A to produce the synchronized target subgraph shown in FIG. 8C.

Although the class graphs shown in FIGS. 8D and 8E focus on nodes, a class graph can also include relationships (e.g., potential relationships, projected relationships) and/or attributes (e.g., potential attributes, projected attributes) that can be derived from (e.g., copied from, transformed from) a source subgraph and included in a target subgraph. In some embodiments, one or more class graphs such as the class graph shown in FIGS. 8D and 8E can be stored in the memory 370 of the graph transformation module 310 shown in FIG. 3. In some embodiments, the graph transformation module 310 shown in FIG. 3 can be configured to identify class graphs that correspond with a modified source subgraph (and/or the original source subgraph). Specifically, the graph transformation module 310 can be configured to identify a source root node of a modified source subgraph (and/or the original source subgraph), and the transformation module 310 can be configured to determine that the source root node corresponds with a root node of a source class graph (and/or target class graph). In some embodiments, the synchronization module 330 can be configured to use, as described above, one or more class graphs to synchronize (e.g., modified) one or more target graphs with one or more source subgraphs.

Figure 9:
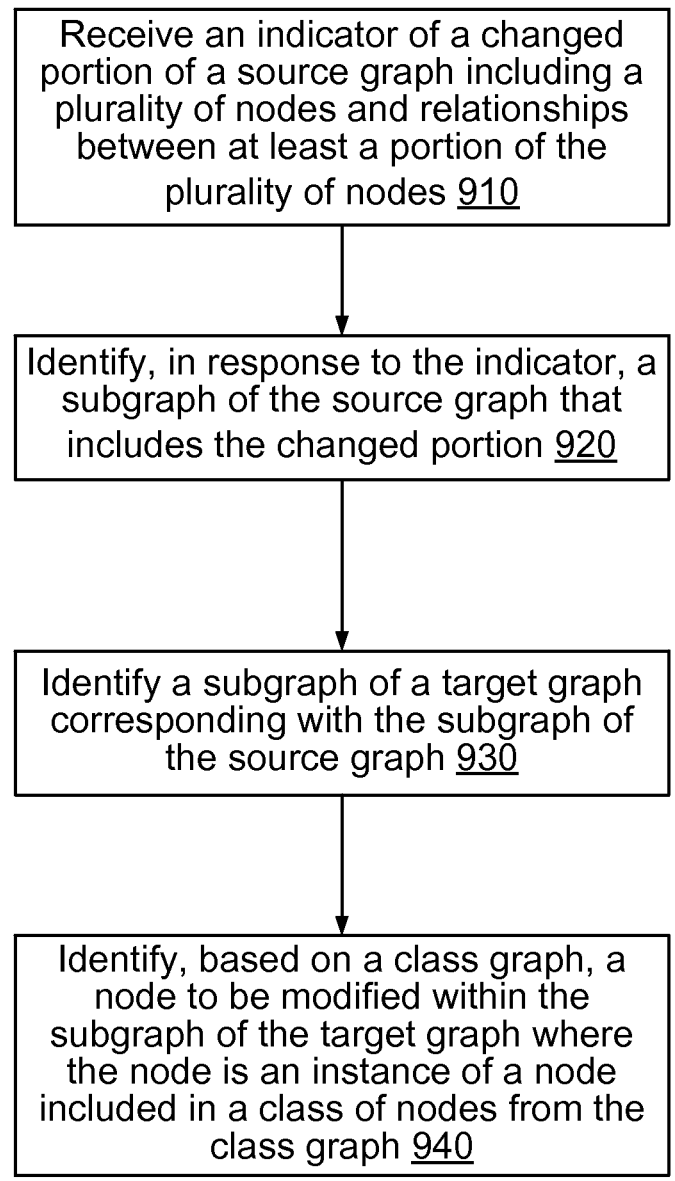
FIG. 9 is a flowchart that illustrates yet another method for synchronizing a target graph with a source graph.

FIG. 9 is a flowchart that illustrates another method for synchronizing a target graph with a source graph. At least some portions of the method shown in FIG. 9 can be performed by, for example, one or more portions of the graph transformation module 310 shown in FIG. 3.

An indicator of a changed portion of a source graph including a plurality of nodes and relationships between the plurality of nodes is received (block 910). In some embodiments, the indicator of the changed portion of the source graph can be produced by a change detector (e.g., change detector 320 shown in FIG. 3). In some embodiments, the change portion of the source graph can include a node that has been removed (e.g., deleted) from the source graph.

A subgraph of the source graph that includes the changed portion is identified in response to the indicator (block 920). In some embodiments, the subgraph of the source graph that includes the changed portion can be identified by a subgraph collector such as subgraph collector 340 shown in FIG. 3. The subgraph of the source graph can be identified based on one or more subgraph collection rules (e.g., subgraph collection rules 33 shown in FIG. 3).

A subgraph of a target graph corresponding with the subgraph of the source graph is identified (block 930). In some embodiments, the class graph can be associated with the subgraph of the source graph based on a root node of the subgraph of the source graph (by the subgraph collector 340 shown in FIG. 3). For example, in some embodiments, a target root node of the subgraph of the target graph corresponding with a source root node of the subgraph of the source graph can be identified, and the target graph can be collected from the target root node.

Based on a class graph, a node to be modified (e.g., updated, removed, inserted) within the subgraph of the target graph is identified where the node is an instance of a node included in a class of nodes from the class graph (block 940). In some embodiments, the identification of the node can be triggered by the class of nodes included in the class graph, which can be a target class graph. In some embodiments, the synchronization module 330 shown in FIG. 3 can be configured to identify and then modify the subgraph of the target subgraph based on the subgraph of the source graph and the class graph.

Referring back to FIG. 3, the graph transformation module 310 includes a script analyzer 360 and a script generator 365. The script analyzer 360 is configured to analyze, for example, a transformation script configured to perform one or more transformation functions associated with graph presentation module 310. For example, a transformation script can be included in, and/or operated by, the subgraph transformer 350 shown in FIG. 3. The transformation script can be configured to, for example, loop over nodes (and/or relationships between nodes) within the source graph 38, manipulate attribute values, define (e.g., construct desired) target nodes within the target graph 39, and/or so forth.

The script analyzer 360 can be configured to determine a manner in which the transformation script handles one or more portions of the source graph 38 to produce the target graph 39. Specifically, the script analyzer 360 can be configured to determine, for example, that the transformation script processes nodes, root nodes, relationships between nodes, and/or attributes in a particular order, during a specified time period, using a specified transformation, and/or so forth. In some embodiments, the analysis performed by the script analyzer 360 can be referred to as a static analysis (e.g., a static analysis of the transformation script). The analysis performed by the script analyzer 360 is directly performed on the transformation script and is independent of any specific source graph (or portion thereof) and/or specific target graph (or portion thereof).

Based on the analysis performed by the script analyzer 360, the script generator 365 can be configured to produce a collection script, a synchronization script, and/or a class script.

The collection script can be included in, and/or operated by, the subgraph collector 340 to identify (e.g., collect) subgraphs within the source graph 38 and/or the target graph 39. The synchronization script can be included in, and/or operated by, the synchronization module 330 to synchronize one or more portions of the target graph 39 with one or more portions of the source graph 38.

Because the script analyzer 360 and the script generator 365 can be configured to collectively process a transformation script that can be used to produce a collection script, a synchronization script, and/or a class script, a collection script, a synchronization script, and/or a class script associated with the transformation script do not need to be separately produced. Thus, a user (e.g., an administrator) of the graph transformation module 310 can define a transformation script that can be analyzed by the graph transformation module 310, which can automatically produce a collection script, a synchronization script, and/or a class script that does not need to be separately produced (e.g., programmed) by the user of the graph transformation module 310.

Figure 10:
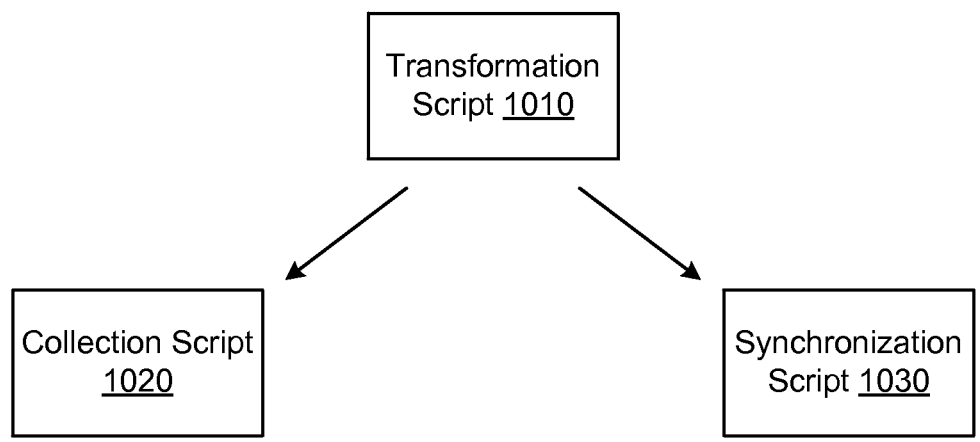
FIG. 10 is a diagram that illustrates a collection script and a synchronization script that can be derived from a transformation script.

FIG. 10 is a diagram that illustrates a collection script 1020 and a synchronization script 1030 that can be derived from a transformation script 1010. The collection script 1020 and/or the synchronization script 1030 can be produced based on the transformation script 1010 by the graph transformation module 310 (e.g., the script analyzer 360 and/or the script generator 365 graph transformation module 310) shown in FIG. 3.

The transformation script 1010 can be any type of script that can be configured to implement a transformation of a source graph (or portion thereof) into a target graph (or portion thereof). In other words, the transformation script 1010 can be configured to process nodes, relationships between nodes, and/or attributes of a source graph to produce a target graph. The transformation script 1010 can include, for example, for loops that can be used to process graph data representing portions (e.g., nodes, relationships, attributes) of a source graph, if statements that may specify a variety of alternatives for processing portions (e.g., nodes, relationships, attributes) of a source graph, and/or so forth. In some embodiments, at least some portions of code branches, variable assignments, and/or so forth can by analyzed when producing the collection script 1020 and/or synchronization script 1030 based on the transformation script 1010.

As a specific example, the transformation script 1010 can be configured to transform certain types of nodes, relationships, and/or attributes. In some embodiments, the transformation script 1010 can be configured to start with a particular node as a root node. Accordingly, the collection script 1020, when defined by the graph transformation module 310 (shown in FIG. 3) based on the transformation script 1010, can be configured to identify the certain types of nodes, root nodes, attributes, and/or relationships for a subgraph. Similarly, the synchronization script 1030, when defined by the graph transformation module 310 (shown in FIG. 3) based on the transformation script 1010, can be configured to synchronize the certain types of nodes, root nodes, attributes, and/or relationships between a subgraph of a source graph and a subgraph of a target graph.

In some embodiments, one or more of the scripts (e.g., transformation script 1010, collection script 1020, synchronization script 1030) can be, for example, a standalone executable file, a single-use method, and/or so forth. In other words, one or more of the scripts can be a computer program that can be written in any form of programming language, including compiled or interpreted languages, and can be deployed in any form, including as a stand-alone program or as a module, component, subroutine, or other unit suitable for use in a computing environment. In some embodiments, one or more of the scripts can be configured to generate programming code that can be used to process (e.g., manipulate) one or more graphs (or graph data) and/or can be configured to produce runtime data associated with one or more one or more graphs (or graph data).

FIG. 11 is an example of a transformation script, according to an embodiment. As shown in FIG. 11, the transformation script includes two sections. In the first section, the transformation script is configured to define a System node within a target graph based on a source graph. To produce the System nodes, Running relationships to all of the Program nodes are followed (e.g., traversed), and RunningOn relationships are defined between System nodes to Server nodes. If the Program nodes are VMware programs, Enabler nodes are generated and linked to the VMware programs. Also, in this embodiment, Contained relationships are followed (e.g., traversed) to locate virtual machines, and locate System nodes (which are created in another subgraph) corresponding to the virtual machines. System nodes that have been located are linked to the Enabler nodes.

In the second section, the transformation script is configured to follow (e.g., traverse Interface relationships to NetworkInterface nodes, and create either an IPv6Address or an IPv4Address (which can be attributes). The address nodes are linked to the System nodes, and the transformation script can be configured to resolve whether Address relationships can be linked to an IPv6Address or an IPv4Address. Although not shown in FIG. 11, a collection script and/or a synchronization script and/or source and target class graphs can be derived from the transformation script shown in FIG. 11.

Figure 12A:
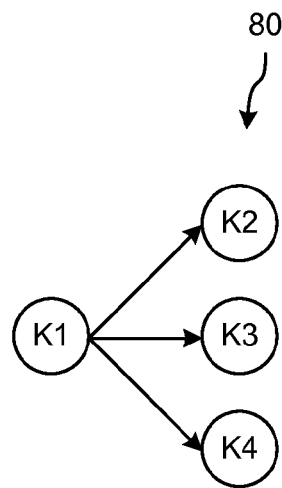
FIGS. 12A and 12B are diagrams that illustrate grouping of nodes as a transformation, according to an embodiment.
Figure 12B:
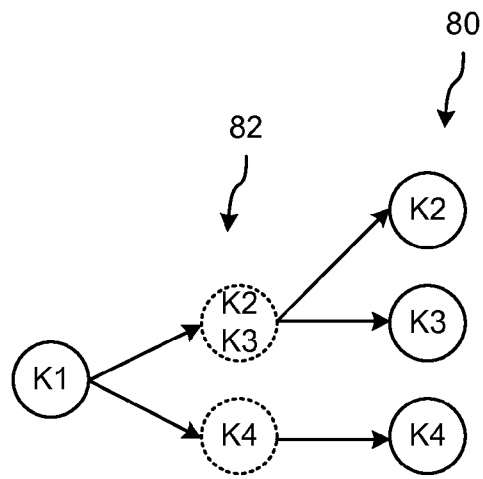

FIGS. 12A and 12B are diagrams that illustrate grouping of nodes as a transformation, according to an embodiment. As shown in FIG. 12A, a source subgraph includes a node K1 that is related to three nodes—node K2, node K3 and node K4. The node K1 can be referred to as a root node and the nodes K2 through K4 can be referred to as being associated with a first level of nodes 80.

As shown in FIG. 12B, some of nodes in the source subgraph shown in FIG. 12B are grouped into a second level of nodes 82 (represented with dashed circles) inserted between the root node and the first level of nodes 82. Specifically, nodes K2 and K3 are collapsed into a single node (within the second level of nodes 82) and the collapsed node is related to node K2 and node K3 in the first level of nodes 80. In this embodiment, node K4 is included in both the first level of nodes 80 and the second level of nodes 82.

In some embodiments, the nodes K2 and K3 can be collapsed in the second level of nodes 82 because they are related to a particular type of product, and the individual nodes K2 and K3 can be included in the first level of nodes 80 as instances of the particular type of product. Thus, the second level of nodes 82 can represent products (e.g., a product layer) and the first level of nodes 80 can represent instances of the product (e.g., an instance layer). In some embodiments, the nodes in the second level of nodes 82 can be renamed as product nodes.

The pseudo-code below can be code specifically adapted for transformations that involve grouping of nodes such as that shown in FIG. 12.

```
for each node:
    generate key
    group with key:
```

-continued

```
perform operations for group
    for each node in group:
        perform operations for nodes.
```

This pseudo-code construct, which includes nested for loops, includes grouping nodes based on a key. The key can be related to, for example, the product types discussed in connection with FIGS. 12A and 12B. In some embodiments, the pseudo-code shown above can be included in, for example, a transformation script (e.g., transformation script 1010 shown in FIG. 10). Use of the pseudo-code construct shown above can avoid transformation processing using, for example multiple, separate for loops. Although FIGS. 12A and 12B were discussed in terms of the subgraph shown in FIG. 12A being transformed into the subgraph shown in FIG. 12B, in some embodiments, the subgraph shown in FIG. 12B can be transformed into the subgraph shown in FIG. 12A.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions stored on a non-transitory computer-readable storage medium, the computer system comprising:
    a subgraph transformer configured to:
        transform a plurality of subgraphs of a source graph into a plurality of transformed subgraphs, the transforming including transforming a first program class into a second program class and a third program class; and
        define a target graph that is a transformed version of the source graph based on the plurality of transformed subgraphs;
    a change detector configured to receive an indicator that a portion of the source graph has been changed;
    a subgraph collector configured to identify a subgraph of the source graph that includes the changed portion in response to the indicator; and
    a synchronization module configured to synchronize a portion of the target graph with the changed portion of the source graph.

2. The computer system of claim 1, wherein the source graph includes a plurality of nodes and relationships between the plurality of nodes, each subgraph from the plurality of subgraphs includes at least a portion of the plurality of nodes and at least a portion of the relationships between the plurality of nodes.

3. The computer system of claim 1, further comprising instructions to:
    identify a node within the source graph as a source root node associated with the changed portion of the source graph, the portion of the target graph that is synchronized including a node corresponding with the source root node.

4. The computer system of claim 1, wherein each subgraph from the plurality of subgraphs is identified for transformation into a plurality of subgraphs based on a subgraph collection rule, a first portion of the plurality of subgraphs are transformed during a first time period and a second portion of the plurality of subgraphs are transformed during a second time period.

5. The computer system of claim 1, wherein the change detector is further configured to identify, in response to the indicator, a source root node associated with the changed portion of the source graph;
the computer system further comprising:
the subgraph collector configured to identify, based on a subgraph collection rule, the subgraph associated with the changed portion of the source graph starting with the source root node,
the subgraph transformer further configured to define, based on a transformation rule, a transformed subgraph associated with the changed portion based on the subgraph of the source graph, and
the synchronization module further configured to modify the portion of the target graph based on the transformed subgraph associated with the changed portion.

6. The computer system of claim 1, wherein the synchronization module is further configured to identify the portion of the target graph for synchronization based on a key of the changed portion of the source graph matching within a key of the portion of the target graph.

7. The computer system of claim 1, wherein a transformed subgraph from the plurality of transformed subgraphs of the target graph corresponds with a subgraph from the plurality of subgraphs of the source graph, the transformed subgraph associated with the target graph including nodes and relationships between nodes in a configuration different from nodes and relationships between nodes of the subgraph associated with the source graph.

8. The computer system of claim 1, wherein:
the subgraph transformer is further configured to produce a first transformed subgraph based on a version of the subgraph of the source graph before the change to the subgraph and a second transformed subgraph based on a version of the subgraph before the change to the subgraph of the source graph, and
the synchronization module is configured to synchronize the portion of the target graph within the changed portion of the source graph based on the first transformed subgraph and based on the second transformed subgraph.

9. A non-transitory computer-readable storage medium storing instructions that when executed cause a processor to perform a process, the instructions comprising instructions to:
access at least a portion of a source graph including a plurality of nodes and relationships between the plurality of nodes, the source graph representing relationships between nodes including showing nodes within each other;
access at least a portion of a target graph including a plurality of nodes and relationships between the plurality of nodes;
identify, based on a subgraph collection rule, a subgraph of the source graph starting at a node from the plurality of nodes identified as a source root node;

define, based on a transformation rule, a transformed subgraph based on the subgraph of the source graph, the transformed subgraph representing relationships between nodes including showing lines between nodes, the transformation rule including transforming a first program class into a second program class and a third program class;
modify a subgraph from the target graph based on the transformed subgraph; and
identify a subgraph of the source graph that includes a changed portion of the source graph in response to an indication that a portion of the source graph has been changed.

10. The non-transitory computer-readable storage medium of claim 9, further comprising instructions to:
receive the indicator of the change to the source graph; and
identify a node from the plurality of nodes as a source root node associated with the change to the source graph.

11. The non-transitory computer-readable storage medium of claim 9, further comprising instructions to:
associate a class graph with the subgraph of the source graph, the class graph including nodes having a probability of being included in the subgraph of the source graph, the instructions to modify including instructions to modify the subgraph from the target graph based on a combination of the transformed subgraph and the class graph.

12. The non-transitory computer-readable storage medium of claim 9, further comprising instructions to:
identify a node from the plurality of nodes of the target graph as corresponding with the source root node of the source graph; and
identify, based on the subgraph collection rule, a subgraph from the target graph starting at the node from the plurality of nodes corresponding with source root node.

13. The non-transitory computer-readable storage medium of claim 9, further comprising instructions to:
modify the subgraph from the target graph until the subgraph from the target graph is identical to the transformed subgraph.

14. The non-transitory computer-readable storage medium of claim 9, wherein the target graph is a transformed version of the source graph.

15. The non-transitory computer-readable storage medium of claim 9, wherein at least some of the nodes of the target graph are excluded from the nodes of the source graph, at least some of the relationships between the plurality of nodes of the target graph are excluded from the relationships between the plurality of nodes of the source graph.

16. The non-transitory computer-readable storage medium of claim 9, wherein at least a portion of the plurality of nodes of the target graph represent devices within a computer network.

17. The non-transitory computer-readable storage medium of claim 9, wherein at least a portion of the plurality of nodes of the target graph represent portions of a social network.

18. A non-transitory computer-readable storage medium storing instructions that when executed cause a processor to perform a process, the instructions comprising instructions to:
receive an indicator of a changed portion of a source graph including a plurality of nodes and relationships between at least a portion of the plurality of nodes;
identify, in response to the indicator, a subgraph of the source graph that includes the changed portion and at least one source node based on at least one type of transformation that was performed on the subgraph of the source graph, the transformation including transforming a first program class into a second program class and a third program class;

identify a subgraph of a target graph resulting from the at least one type of transformation of the subgraph of the source graph; and identify, based on a class graph, a node to be modified within the subgraph of the target graph, the node being an instance of a node included in a class of nodes from the class graph.

19. The non-transitory computer-readable storage medium of claim 18, wherein at least a portion of the changed portion of the source graph is based on deletion of the node from the source graph.

20. The non-transitory computer-readable storage medium of claim 18, wherein the node to be modified is identified based on a comparison of the subgraph of the source graph with the subgraph of the target graph, the instructions further comprising instructions to:

search for instances of nodes within the class of nodes based on the class of nodes being included in the class graph, the node to be modified is identified in response to the search.

21. The non-transitory computer-readable storage medium of claim 18, wherein the class graph is a target class graph that is a transformed version of a source class graph corresponding with the source graph.

22. A non-transitory computer-readable storage medium storing instructions that when executed cause a processor to perform a process, the instructions comprising instructions to:

receive an indicator of a changed portion of a source graph including a plurality of nodes and relationships between at least a portion of the plurality of nodes;

identify, in response to the indicator, a subgraph of the source graph that includes the changed portion and at least one source node based on at least one type of transformation that was performed on the subgraph of the source graph, the subgraph of the source graph representing relationships between nodes including showing nodes within each other, the at least one type of transformation including transforming a first program class into a second program class and a third program class;

identify a subgraph of a target graph resulting from the at least one type of transformation of the subgraph of the source graph, the subgraph of the target graph representing relationships between nodes including showing lines between nodes; and modify the subgraph of the target graph based on a log characterizing changes to the changed portion to the source graph.

23. The non-transitory computer-readable storage medium of claim 22, wherein at least a portion of the changed portion of the source graph is based on deletion of the node from the source graph.

24. The non-transitory computer-readable storage medium of claim 22, wherein the identifying the at least one source root node includes identifying at least one host computer within the subgraph of the source graph as the at least one source node.

25. The computer system of claim 1, wherein the subgraph transformer is further configured to locate and remove instances of the second class and the third class from the transformed subgraphs.

* * * * *